Nov. 14, 1972   H. N. HOFFMAN   3,702,719
INTEGRATED JOURNAL AND THRUST BEARING
Filed Nov. 9, 1971   3 Sheets-Sheet 1
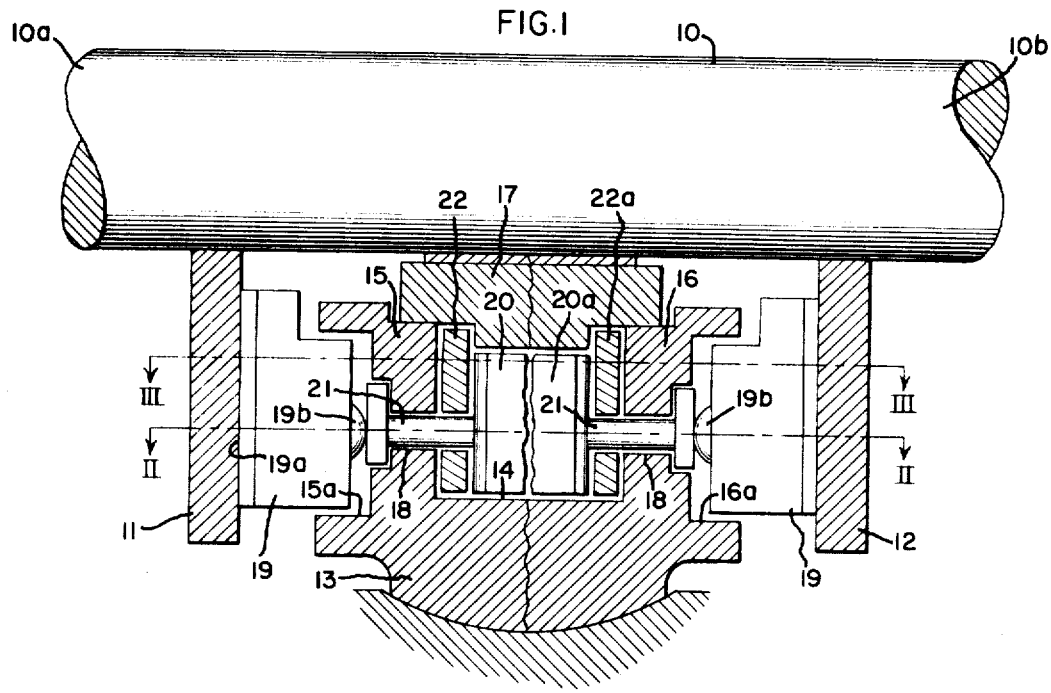
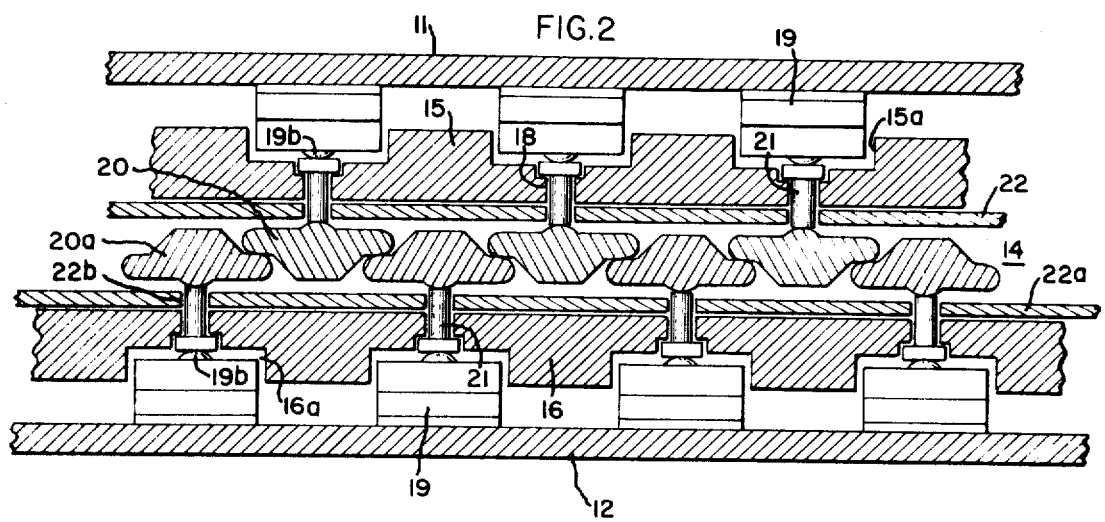
INVENTOR:
HERBERT N. HOFFMAN,
BY W. C. Crutcher
HIS ATTORNEY.

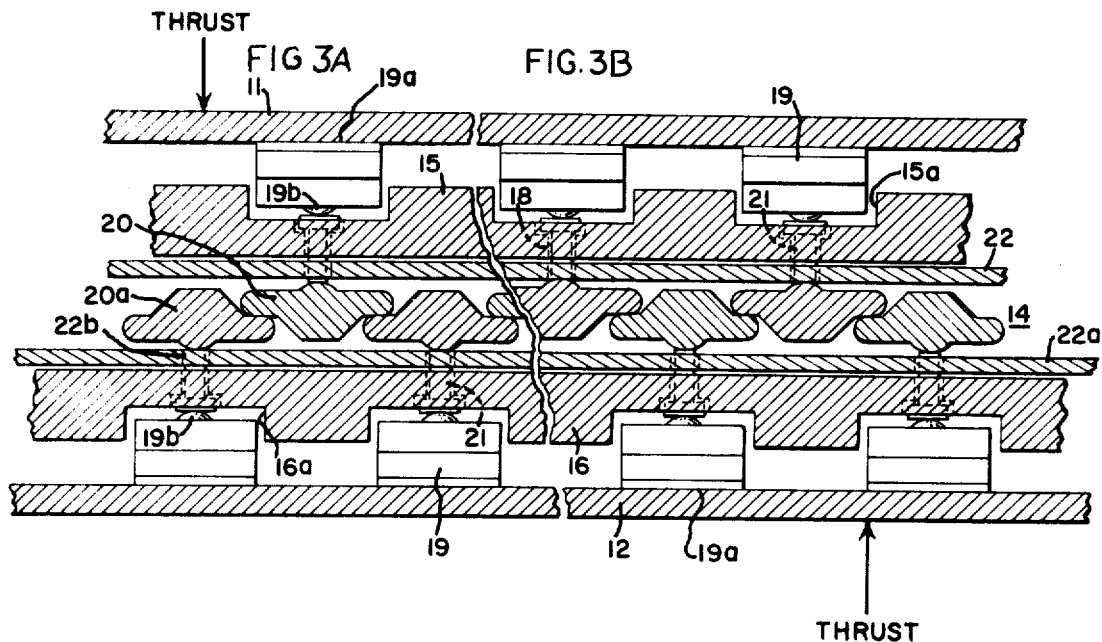

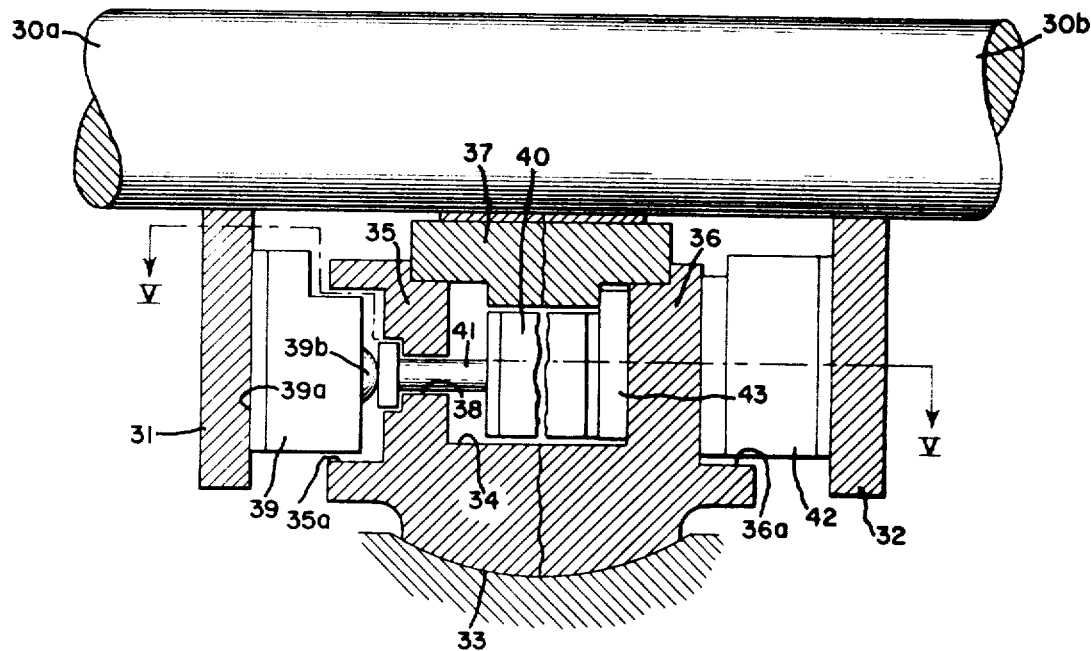
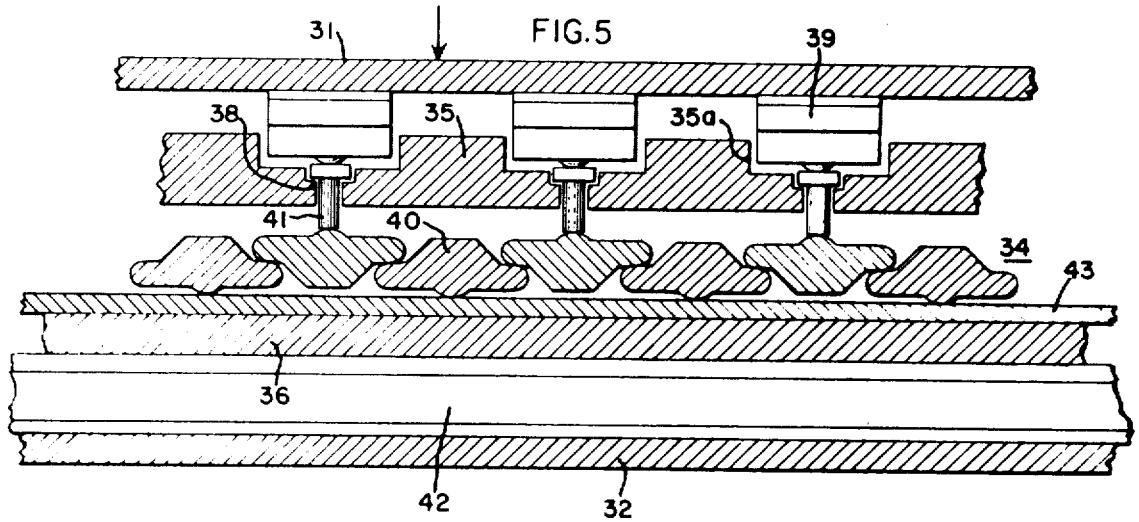

United States Patent Office 3,702,719
Patented Nov. 14, 1972

---

3,702,719
INTEGRATED JOURNAL AND THRUST BEARING
Herbert N. Hoffman, Lunenburg, Mass., assignor to
General Electric Company
Filed Nov. 9, 1971, Ser. No. 197,077
Int. Cl. F16c 17/06
U.S. Cl. 308—160
3 Claims

ABSTRACT OF THE DISCLOSURE

An integrated journal and thrust bearing incorporates a circumferential housing with an annular cutout portion therein extending radially outward from the inside circumference of the housing by which a pair of circumferential wall members are defined. A journal bearing assembly extends between the wall members at the inside circumference of the housing. At least one of the wall members has a plurality of circumferentially spaced apertures, each on an axis substantially parallel to the housing axis, within which are placed a plurality of thrust transmitting pins. At the outer surface of the wall member against each thrust pin is placed a tiltable thrust shoe. At the inner surface of the wall member against each pin is placed a leveling plate. A plurality of tiltable bridging leveling plates occupy the annular cutout area and serially rock in response to changes in thrust upon the thrust shoes in order to distribute the thrust throughout the apparatus.

BACKGROUND OF THE INVENTION

This invention relates to bearings used in rotating machinery, and more particularly to means for reducing the length of shaft required for the application of thrust and journal bearings in such machinery.

Experience has taught that problems with shaft stability and sensitivity are aggravated by increased shaft length. Prior art bearing apparatus utilize journal and thrust bearings comprising separate units in applications to radially and axially loaded rotating shafts. Each bearing unit occupies a given shaft length, and a plurality of separate units considerably increases requisite shaft lengths.

BRIEF SUMMARY OF THE INVENTION

It is therefore an object of the present invention to incorporate thrust and journal bearing components into a single unit, thereby reducing the shaft length devoted to bearing application and increasing stability. Further objects will become apparent from the description of the present invention which follows.

The present invention may be illustrated by a circumferential housing, as described hereinafter, placed about a rotating shaft between two thrust collars fixed to the shaft. The housing is provided with an annular-cutout portion which extends generally radially outward from the inside circumference of the housing and defines a pair of circumferential wall members. Surmounting the annular cutout between the circumferential walls is placed a journal bearing of any desired type, for example a sleeve bearing.

A plurality of tiltable thrust shoes are circumferentially spaced about the outside surface of at least one wall member in abutment to a thrust collar. That same wall member is supplied with a plurality of circumferentially spaced apertures or holes therethrough, each having its axis substantially parallel to the axis of the housing. Within each aperture is to be placed a thrust transmitting pin whose outside end engages and supports one of the thrust shoes and whose inside end engages one of a plurality of bridged tiltable leveling plates.

In this fashion, the single bearing housing unit incorporates both a journal and thrust bearing. Both circumferential wall members may be formed similarly to the above described wall member if application of the apparatus is to be made to a shaft which carries active axial loading in both directions. If application is to be made to a shaft carrying active axial thrust in only one direction, one circumferential wall member may carry tapered land bearing elements.

An embodiment of the present invention is illustrated in the drawing in which:

FIG. 1 is a cross-sectional view of a first embodiment of the present invention in which a journal bearing is integrated with thrust bearing elements suitable for taking active thrust in both axial directions;

FIG. 2 is a developed view looking radially outward at line II—II in FIG. 1;

FIG. 3A is a developed view looking outward at line III—III in FIG. 1; wherein the bearing is subjected to thrust in one axial direction;

FIG. 3B is a view similar to that in FIG. 3A, but wherein the bearing is subjected to a thrust in the opposite axial direction;

FIG. 4 is an illustration of a second embodiment of the present invention suitable for taking active thrust in one axial direction; and FIG. 5 is a developed view looking outward at line V—V in FIG. 4.

DETAILED DESCRIPTION OF EMBODIMENTS

The new and improved bearing configuration of the present invention may be applied to shafts which undergo axial thrust in both axial directions. An embodiment of the present invention suitable for use in such an application is disclosed in FIGS. 1, 2 and 3A, and 3B.

Referring to FIG. 1, thrust collars 11 and 12 are mounted upon rotating shaft 10 in fixed axial position by suitable means not shown. The bearing comprises a circumferential housing 13 having an annular cutout portion 14 therein which extends radially outward from the inside circumference of the housing. This cutout portion 14 defines a pair of wall members 15 and 16 within housing 13.

A preselected journal bearing 17 is mounted atop and bridging wall members 15 and 16. In this embodiment, the journal bearing is in the form of a sleeve bearing; however, the concept could be applied to the supporting structure for any type journal bearing, for example a tilting shoe journal bearing.

Referring to FIGS. 1, 2, 3A, and 3B, wherein the thrust bearing elements are disclosed, circumferential walls 15 and 16 are supplied with recesses or cavities 15a and 16a. Each recess is supplied with a hole or aperture 18 through its base portion leading into annular cutout 14. Within each aperture is disposed a thrust pin 21. Within each recess or cavity 15a and 16a is disposed a tiltable thrust shoe 19. Each thrust shoe carries a bearing surface 19a for engaging a thrust collar and a spherical protrusion 19b at its rear for engaging thrust pin 21 in a single point contact. Within annular cutout 14 are disposed a plurality of bridging, tiltable leveling plates 20 and 20a. Each leveling plate is adapted to engage the rear of each thrust pin 21 in a tiltable contact. Further, each leveling plate is adapted to engage adjacent leveling plates in a tiltable contact. In order to maintain the proper spacing of the internal elements, shims 22 and 22a are placed against the inner surface of walls 15 and 16, and are supplied with a plurality of apertures 22b for the passage of thrust pins 21.

Referring to FIG. 1, the shaft 10 is supported in the radial direction by journal bearing 17 and in the axial directions by thrust shoes 19. In operation, the apparatus is represented by FIGS. 3A and 3B. Referring to FIG. 3A, the apparatus is subjected to an axial thrust in the direction shown, thrust collars 11 and 12 rotating with respect to thrust shoes 19. At a given rotational speed, the tiltable thrust shoes 19 shown in the upper portion of FIG. 3A tilt about spherical projections 19b to assume a converging angle and an equilibrium clearance between the thrust shoe bearing surface 19a of each shoe and the loaded thrust collar 11. An oil film is developed within the clearance, which film is capable of carrying high loads in the direction of the thrust. Changes in rotational speed or thrust causes a new equilibrium position to be assumed by the thrust shoes 19 with respect to the loaded thrust collar 11.

Under particular thrust and rotational speed conditioners, given equilibrium is attained as described above. The load upon the upper thrust shoes 19 in FIG. 3A is transmitted by means of spherical projections 19b through thrust pins 21 to the plurality of leveling plates 20 facing these loaded thrust shoes. The load is distributed among the plurality of tiltable, bridging leveling plates 20 and 20a which tilt relative to the loaded thrust pins 21 and relative to one another until uniform loading is reached. The thrust is ultimately delivered to shim 22a and housing wall 16. This is evidenced in FIG. 3A by a clearance between leveling plate 20 and its associated shim 22 and an absence of clearance between leveling plate 20a and shim 22a. As a result of the action of the leveling plates, the force of the axial load is distributed equally among upper thrust shoes 19, and delivered to housing wall 16 for transmission to the ground support of the apparatus.

FIG. 3B shows the condition of the apparatus when subjected to a load in the axial direction opposite that of FIG. 3A. In this instance collar 12 is the thrust transmitting collar. Thrust shoes 19 facing collar 12 will assume a converging angle with collar 12, and the oil film developing within the clearance therebetween will support substantial loads. The thrust upon each thrust shoe is transmitted by means of thrust pins 21 to leveling plates 20a facing the loaded direction. Once again, the thrust is impressed upon each tiltable thrust leveling plate 20 adjacent plates 20a, and the tiltable leveling plate assume an equilibrium position which is suitable for the support of the thrust. In sum, the thrust upon the apparatus through thrust collar 12 is divided between the plurality of thrust shoes, is transmitted by the plurality of thrust pins to the leveling plates which, in equilibrium position, serve to retransmit the force of shim 22 and wall 15. Thus the apparatus of the first embodiment is suited to receive thrust in either axial direction.

Independently of this action, the journal bearing elements 17 of the bearing apparatus shown in FIGS. 1, 2, 3A, and 3B effect support of the shaft 10 in the radial direction. Radial force upon journal bearing 17 is transmitted to walls 15 and 16 and thereby to ground support structure not shown. In this way, the singular structure of the apparatus of this invention serves as both axial and radial support bearings.

The foregoing is a representation of the operation of the apparatus of the present invention adapted for use in application subjected to axial thrust in both axial direction. The apparatus of the present invention can also be applied to shafts experiencing active thrust in one axial direction only. The configuration of a bearing utilizing the concepts of the present invention and adapted to this latter application is disclosed in FIGS. 4 and 5.

In FIG. 4, rotating shaft 30 carries thrust collars 31 and 32 fixed to the shaft by suitable means not shown. The bearing unit comprises a circumferential housing 33 having an annular cutout portion 34 therein extending radially outward from the inside circumference of the housing and defining circumferential wall members 35 and 36. Wall members 35 and 36 are adapted to support journal bearing structure 37 of a preselected type.

Referring now to FIGS. 4 and 5, circumferential wall member 35 may be seen to be provided with recesses or cavities 35a. Cavities 35a on the active thrust side of the bearing are supplied with apertures 38 through their base portion into cutout 34. Within each aperture 38 is disposed a thrust pin 41. A tiltable thrust shoe 39 having a bearing surface 39a adapted to engage thrust collar 31 and a spherical protrusion 39b adapted to rock upon the front face of thrust pin 41 is placed within each cavity 35a. A plurality of tiltable, bridging leveling plates 40 are placed within the annular housing 33, alternate leveling plates engaging the rear of thrust pins 41 and the remaining leveling plates engaging shim 43 which lines the inside surface of wall 36. Wall member 36 is provided with tapered land bearing 42 adapted to engage thrust collar 32.

Operation of this apparatus is exemplified by the configuration of FIG. 5 in which axial thrust is applied to the apparatus by thrust collar 31 in the direction shown. The thrust shoes 39 tilt about their spherical protrusions 39b as they seek an equilibrium position and assume a converging angle with thrust collar 31 in which state an equilibrium clearance between bearing surface 39a and thrust collar 31 will be assumed. An oil film will be developed within this clearance to support the thrust. Transmission of the thrust from shoes 39 through thrust pins 41 to leveling plates 40 occurs. The thrust is distributed and transmitted by the plurality of leveling plates to shim 43 and therethrough to the wall 36 and ground support not shown. Inactive thrust in the opposite direction to that shown in FIG. 5 are counteracted by the tapered land bearing 42.

Independently of this action, the journal bearing elements 37 of the bearing apparatus shown in FIG. 4 effect support of shaft 10 in the radial direction. Radial force upon journal 37 is carried to walls 35 and 36 and thereby to ground support structure not shown. In this way, the unitary structure of the apparatus of this invention serves to support both axial and radial forces upon the shaft.

In the foregoing manner, the concepts of the present invention may be applied to effect integrated journal and thrust bearings adapted to support shafts which are subjected to active thrust in one or both axial directions and to thrust in radial directions. Changes in the configuration of the apparatus may be made by one skilled in the art without departing from the spirit of the invention. Therefore, the foregoing embodiments of the present invention are merely for illustration and are not to be restrictive of its scope.

What is claimed as new and desired to be secured by Letters Patent of the United States is:

1. An integrated journal and thrust bearing comprising:
   a circumferential housing having an annular cutout portion therein which extends generally radially outward from the inside circumference of said housing, and defines a pair of circumferential wall members;
   a circumferential journal bearing assembly extending between said wall members at the inside circumference of said housing;

at least one of said wall members having a plurality of circumferentially spaced apertures therein, each on an axis substantially parallel to the axis of said housing;

a plurality of tiltable thrust shoes circumferentially spaced about the outside surface of said wall member to support a load in a generally axial direction;

a plurality of leveling plates circumferentially spaced and contained within said annular cutout portion; and a plurality of thrust transmitting pins extending from said thrust shoes through said apertures and to the plurality of said leveling plates.

2. An integrated bearing according to claim 1 further including a plurality of circumferentially spaced recesses in said wall member adapted to receive said thrust shoes to maintain clearance between adjacent of said thrust shoes.

3. An integrated bearing according to claim 1 in which a tapered land bearing is circumferentially positioned proximate the outside surface of an opposite wall member and are adapted to support load in the opposite axial direction.

References Cited
UNITED STATES PATENTS 2,874,007  2/1959  Cametti et al. _____ 308—160

MILTON KAUFMAN, Primary Examiner

F. SUSKO, Assistant Examiner